United States Patent [19]
Cornils et al.

[11] Patent Number: 5,507,994
[45] Date of Patent: Apr. 16, 1996

[54] PROCESS AND APPARATUS FOR PROVIDING A SHAPED POLYMER FRAME ON A GLASS PLATE

[75] Inventors: Gerd Cornils, Merzenich; Herbert Joeris, Wurselen; Rolf Kotte, Alsdorf; Heinz Scholl, Eschweiler, all of Germany

[73] Assignee: Saint Gobain Vitrage, Courbevoie, France

[21] Appl. No.: 286,725

[22] Filed: Aug. 5, 1994

[30] Foreign Application Priority Data

Aug. 9, 1993 [DE] Germany .......................... 43 26 650.9

[51] Int. Cl.⁶ ................................................. B29C 47/02
[52] U.S. Cl. .................... 264/252; 156/108; 264/177.16; 425/113; 425/466
[58] Field of Search ..................................... 264/252, 261, 264/177.17–177.20, 177.16, 177.10; 156/107, 500, 108, 99, 109, 102; 425/113, 466

[56] References Cited

U.S. PATENT DOCUMENTS

| | | | |
|---|---|---|---|
| 4,584,155 | 4/1986 | Zanella | 264/252 |
| 4,973,436 | 11/1990 | Lisec | 264/261 |
| 5,061,429 | 10/1991 | Yoshihara et al. | 264/252 |
| 5,108,526 | 4/1992 | Cornils et al. | 156/109 |
| 5,183,612 | 2/1993 | Suita et al. | 264/177.1 |
| 5,256,361 | 10/1993 | Keys | 264/177.19 |
| 5,273,704 | 12/1993 | Scholl et al. | 264/252 |
| 5,336,349 | 8/1994 | Cornils et al. | 156/108 |
| 5,358,397 | 10/1994 | Ligon et al. | 264/177.17 |
| 5,362,428 | 11/1994 | Tsujino et al. | 264/252 |
| 5,382,395 | 1/1995 | Hoenke | 156/108 |

FOREIGN PATENT DOCUMENTS

| | | |
|---|---|---|
| 0493068A1 | 1/1992 | European Pat. Off. . |
| 4-241925 | 8/1992 | Japan ................... 264/177.1 |

*Primary Examiner*—Jeffery R. Thurlow
*Attorney, Agent, or Firm*—Pennie & Edmonds

[57] ABSTRACT

A process for the production of a plate with a polymer frame shaped onto the edge of the plate. The frame is extruded onto the plate while the latter is held stationary in a working station of a handling automaton or robot with a support device which corresponds to the shape of the plate in such a way that the edge of the plate projects freely over the support face of the support device. With the aid of the robot, an extrusion die having a through, mouth-like slot with two jaws engages the top and bottom surfaces of the circumferential edge of the plate as the mouth-like slot engages the plate edge. At the front end of the two jaws of the die mouth, there are sealing ledges movable at right angles to the plate surfaces, which are supported on the latter during the extrusion process.

22 Claims, 4 Drawing Sheets

PROCESS AND APPARATUS FOR PROVIDING A SHAPED POLYMER FRAME ON A GLASS PLATE

TECHNICAL FIELD

The present invention relates to a process for producing a plate-like object, particularly a glass plate, provided with a shaped polymer frame. It also relates to an apparatus suitable for performing this process.

BACKGROUND ART

It is known to provide glass plates with a polymer frame that surrounds the edge of the plate. This is typically accomplished by placing the glass plate between two mold halves, in which are formed mould cavities corresponding to the desired frame profile. The mold halves are closed and the mold cavities are then filled with a melted thermoplastic polymer or polymer reaction system to form the frame profile. Processes of this type are used to a significant extent and are described, for example, in U.S. Pat. Nos. 4,584,155, 4,688,752, 4,732,553 and 4,830,804; EP 0,333,538, DE 1,945,291, DE 3,920,925, and CA 1,234,660. Processes of this type require complicated molds which due to their considerable costs, render these processes too expensive for use on small batches.

According to another known process, frame-like profiles or frame parts made from a polymer are shaped onto the glass plate by an extrusion process. Here again, it is possible to use reaction systems, such as moisture-hardening polyurethane systems or thermoplastic polymers, to form the profile. Processes of this type are shown, for example, in the following U.S. Pat. Nos. 4,571,278, 5,062,248, 4,933,032, 5,095,669 and 5,108,526, and European Patent Applications 0,479,677, 0,494,824, 0,524,060, 0,524,092, 0,531,201 and 0,537,067. In these processes, the polymer strand is extruded through an extrusion die and placed on the top surface of the glass plate along the circumference.

It has also been proposed to produce a glass plate with a polymer frame by placing the glass plate on a mold bed, which in the edge region of the glass plate engages the lower surface of the plate over and beyond the glass plate circumference, thus forming an extension of the glass plate surface. With the aid of an extrusion die, a profile strand can then be extruded on the glass plate edge which projects beyond the circumference and which is bounded by the mold face (see, e.g., DE 4,232,554). Thus, an L-shaped polymer frame can be provided on the edge of the glass plate, with one part of the L-shape being provided on the top surface of the plate while the other portion of the L-shape is positioned on the outer main surface, i.e. on the outside edge of the glass plate, where it terminates flush with the bottom of the glass plate surface.

There is a need for an improved process for the production of glass plates having a polymer frame shaped on the edges thereof on at least two sides, i.e., on at least the top surface of the plate and the circumferential edge, wherein the process can economically be used for small production batches. The present invention proposes a new process and apparatus which satisfies this need.

SUMMARY OF THE INVENTION

In particular, the process according to the invention comprises holding the glass plate in a stationary manner with the aid of a support device in such a way that the edges of the glass plate project freely outside of the support faces of the support device so that they can be provided with the shaped polymer frame. In addition, after the extrusion process is completed, the polymer is shaped onto the glass plate with the aid of an extrusion die that is guided along the plate edge. This die engages the top and bottom surfaces and edge of the glass plate and forms a closed die cross-section with the main surfaces (i.e., top and bottom surfaces) of the glass plate, in such a way that the extruded profile strand is adhesively deposited on at least one main face of the glass plate and on its adjacent edge.

Thus, the process according to the invention utilizes the known advantages of the extrusion process in order to provide glass plates with a shaped polymer frame, such as have only hitherto been producible with the aid of injection molding-like processes which require large and complicated molds. It is possible with modern handling automatons or robots to so accurately perform the path control of the extrusion head around the glass plate that in this way framed glass plates can be produced wherein the outer contour has very strict tolerances.

With this process and apparatus, it is even possible to compensate for unavoidable glass plate dimensional tolerances, so that the dimensional accuracy of the framed glass plates is even greater than the dimensional accuracy of the glass plates themselves. It thus becomes possible to use glass plates having larger dimensional tolerances without affecting the final dimensions of the framed glass plate. However, the particularly important advantage of the process according to the invention is that without any change to the extrusion dies, it is possible to provide glass plates of the most varied shapes and sizes with a shaped polymer frame. For this purpose it is merely necessary to adapt the robot path program to the particular plate shape.

In the case of the process according to the invention, the glass plate to be framed must be very carefully positioned in the working area of the extrusion die and held on a support adapted to the glass plate shaped in such a way that the glass plate edge, at least on the portion which is to be provided with the frame, is freely accessible to receive the extrusion head. Since the glass plate is preferably provided with the polymer frame over its entire circumference, the extrusion die must be designed in such a way that it bonds the extrusion cross-section together with the glass plate. This means that on the top and bottom surfaces of the glass plate, the die must have sealing faces which are capable of sliding on the main faces of the glass plate while ensuring good sealing of the die cross-section with respect to the glass surfaces. This can be accomplished, for example, by utilizing spring-loaded sealing ledges, which follow the positioning of the extrusion die on the glass plate edge and can be maintained in a sealing position.

It is optionally possible, however, to use an extrusion die with rigidly positioned sealing faces. This presupposes that the glass plates to be provided with the frame have very small thickness tolerances and that the internal dimensions of the die mouth are very accurately matched to the thickness dimensions of the glass plates. The gap between a sealing face of the extrusion die and the glass surface can vary between approximately 0.1 and 0.5 mm depending upon the viscosity and related characteristics of the polymer which is used.

In the case of extrusion dies that have a rigid die mouth, the extruded polymer strand can be removed by movement of the die when the die is removed from the glass plate at the end of the extrusion operation. However, the frame profile at this point can be re-shaped in a problem-free manner according to known methods.

It is possible with the aid of the process according to the present invention to extrude polymer frames onto glass plates having an essentially L-shaped cross-section with the L-shape contacting one of the main surfaces of the plate and the edge while terminating flush with the other main face of the glass plate. Such frames are needed for certain automobile windshields which, for wind slip reasons, are installed in the car body in an outer skin-flush manner. In this case, the extrusion die must be designed and guided in such a way during the extrusion operation that the corresponding boundary surface of the die is in contact with the marginal area of the glass plate up to the circumferential edge and radially outwardly extends onto the main face of the glass plate.

It is also possible to provide the glass plate with a frame by using the process according to the invention to surround the edge of the glass plate on all three sides. In this embodiment, the extruded frame can have a random cross-section, if desired.

BRIEF DESCRIPTION OF THE DRAWINGS

Further features and advantages of the invention can be gathered from the claims and the following description with respect to the attached drawings, wherein:

DETAILED DESCRIPTION OF THE PREFERRED EMBODIMENTS

In the description that follows, the invention is described in conjunction with the extrusion of polymer frames onto glass plates, particularly those for automobile vehicle windshields. However, it is pointed out that with the aid of the process according to the invention it is also possible to provide other plate-like objects, e.g. doors or plate-like components, with corresponding frames or seals.

Figure 1:
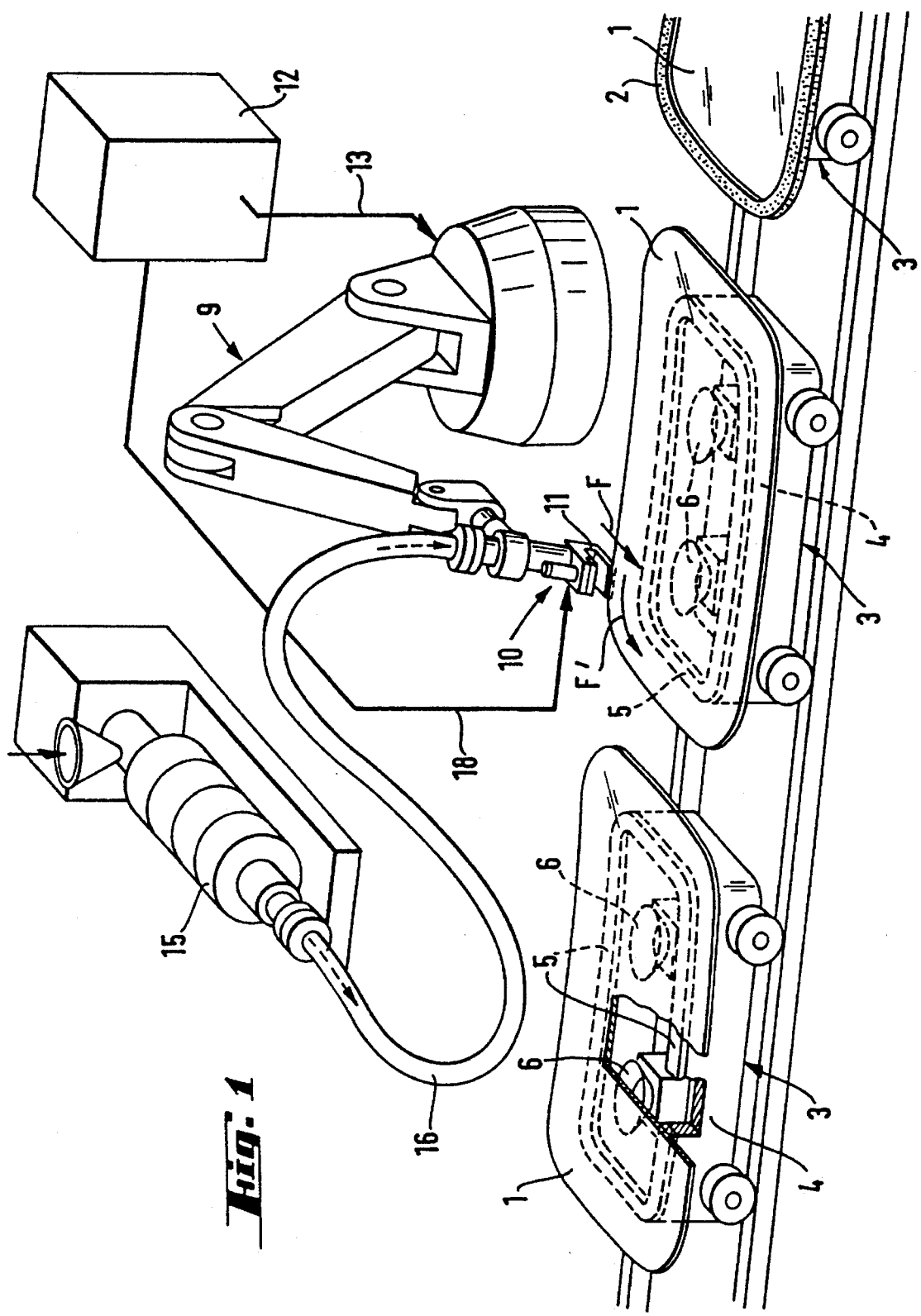
FIG. 1 illustrates an installation for performing the process in an overall view.

As shown in FIG. 1, glass plates 1, which in the represented case are constituted by curved car glass plates and which are to be provided with a profiled polymer frame 2, are installed on movable supports 3 and are successively moved into the processing station where the profile frame 2 is to be extruded onto the glass. The glass plates 1 are initially carefully prepared in a not shown, upstream working station, in that their surface is cleaned in the area in which the frame is to be extruded on and provided with a suitable primer system, which is matched to the polymer mass to be extruded.

The thus prepared glass plates 1 are then placed in precisely positioned manner on the support 3 and fixed thereon by corresponding vacuum means. For this purpose each support 3 has a support frame 4 corresponding to the shape of the glass plate 1 and which is provided with an elastic support layer 5, as well as several suction plates 6 with which the glass plate 1 is pressed against the elastic support layer 5 of the support frame 4. The displaceable support 3 is then moved in timed manner into the extrusion station where the supports are carefully positioned in such a way that the glass plate precisely assumes its processing position with respect to the robot 9. As soon as the glass plate 1 has reached its extrusion position the robot 9 comes into action. It brings the extrusion die 11 into its working position, in that it initially moves it in the direction of the arrow F over the edge of the glass plate 1 and is then guided in the direction of the arrow F' along the edge of the glass plate 1. Simultaneously the die head 10 is controlled by means of the control line 18 of the central control unit 12, so that additional functions of the die are put into operation, such as the switching on and switching off of the polymer volume flow, a change to the die aperture or other functions.

Obviously, the device of FIG. 1 using a robot to drive the extrusion die along the plate border may be adapted to a man powered die. In such a case, the polymer flow has to be controlled by the die speed along the border in such a way that the profiled bead is of an even appearance.

In the represented case a thermoplastic polymer is shaped onto the glass plate 1. The thermoplastic polymer is melted in an extruder 15 and supplied by a heated pressure hose 16 to the extrusion head 10. Suitable thermoplastic polymers are e.g. thermoplastic polyolefin elastomers constituted by isotactic polypropylene and ethylene-propylene-diene rubber. When using thermoplastic polymer the glass plates are appropriately preheated, e.g. to approximately 150° C. However, in place of thermoplastic polymers it is also possible to use reaction systems, e.g. moisture-hardening polyurethane systems. In this case the extruder 15 is replaced by a suitable pump, which supplies the material to be extruded by means of this hose 16 to the extrusion head 10.

When the extrusion head 10 reaches its starting position again after passing round the glass plate, the polymer volume flow is interrupted, the extrusion head 10 is removed from the glass plate 1 again counter to the direction of the arrow F and the glass plate provided with the frame 2 is moved into the next processing station, whilst simultaneously the next glass plate 1 passes into the extrusion station and the extrusion cycle recommences.

The transition point between the start and finish of the extruded polymer strand necessarily has deformations due to the radial movement of the die at the end of the extrusion process. Thus, this transition point must be reworked in a following process stage. This reworking or reprocessing of the transition point can e.g. take place according to a process as described in EP 421,833 A2 or EP 524,060 A1. The reprocessing of the transition zone is particularly simple if a thermoplastic polymer is extruded, because in this case it is merely necessary to remold with the aid of a heated mold.

Figure 2:
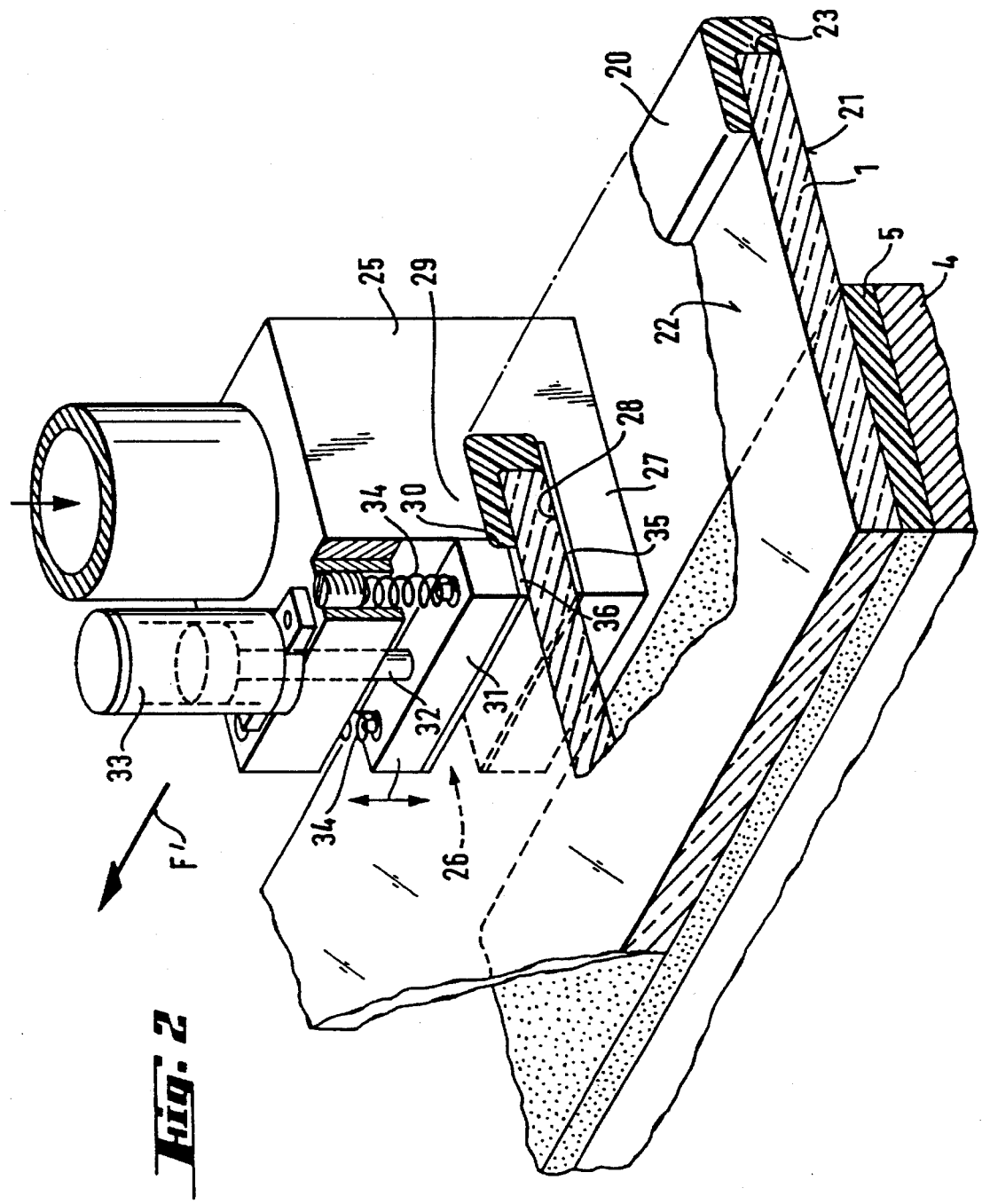
FIG. 2 shows an embodiment of an extrusion head for extruding on a L-shaped polymer frame.

FIG. 2 shows the basic construction of an extrusion die of the type used if a plate glass 1 is to be provided with a polymer frame 20, which on one side of the glass plate, i.e. on the side of the main face 21, is flush with the main face 21, but otherwise is cross-sectionally L-shaped, one leg of the frame profile engaging on the main face 22 and the other leg on the circumferential surface 23 of the glass plate and are firmly connected to the glass surface.

The extrusion die 25 has a through, referred to as the die mouth 26 in the movement direction and with which it engages over the edge of the glass plate 1. On the lower side the die mouth 26 is bounded by law 27 which has an upper face 28 in contact with the main face 21 of the glass plate during the extrusion process. On the other side, a die mouth 26 is formed by jaw 29.

On the rear wall of the die 25 considered in the movement direction is provided a calibrated die aperture which defines the cross-section of the extruded polymer strand. The mouth opening of the die is bounded by wall 30 of movable ledge 31, which is mounted so as to move vertically. By means of rod 32, ledge 31 can be raised with the aid of a pneumatic or hydraulic cylinder 33. In its lower position, the ledge 31 is pressed by helical springs 34 or other equivalently acting means against the surface 22 of the glass plate 1. The contact force exerted by the springs 34 should be adjusted in such a way that a good sealing of the faces of the die 25 sliding on both sides of the glass plate 1 is ensured. However, the contact pressure must not be excessively high so as to lead to excessive frictional forces during the extrusion process, which forces can impede the die movement and lead to wear to the sliding faces of the die.

The cylinder 33 operating the sealing ledge 31 is also controlled by a central control unit 12. The sealing ledge 31 is brought by means of the cylinder 33 into its upper end position when the die 25 is moved from an inoperative position into an operative position on the glass plate edge. At the end of the extrusion process, the die is returned to its inoperative position alongside the glass plate.

The sliding faces of the die 25, namely face 27 of recess 26 and the lower side of ledge 31, are each provided with an elastic material support layer 35, 36 which has good sliding characteristics on glass. These support layers 35, 36 serve to provide a better sealing of the die aperture against the glass plate and facilitate the sliding movement. Appropriately, these support layers 35, 36 are installed in such a way that a simple and rapid replacement is possible.

Figure 3:
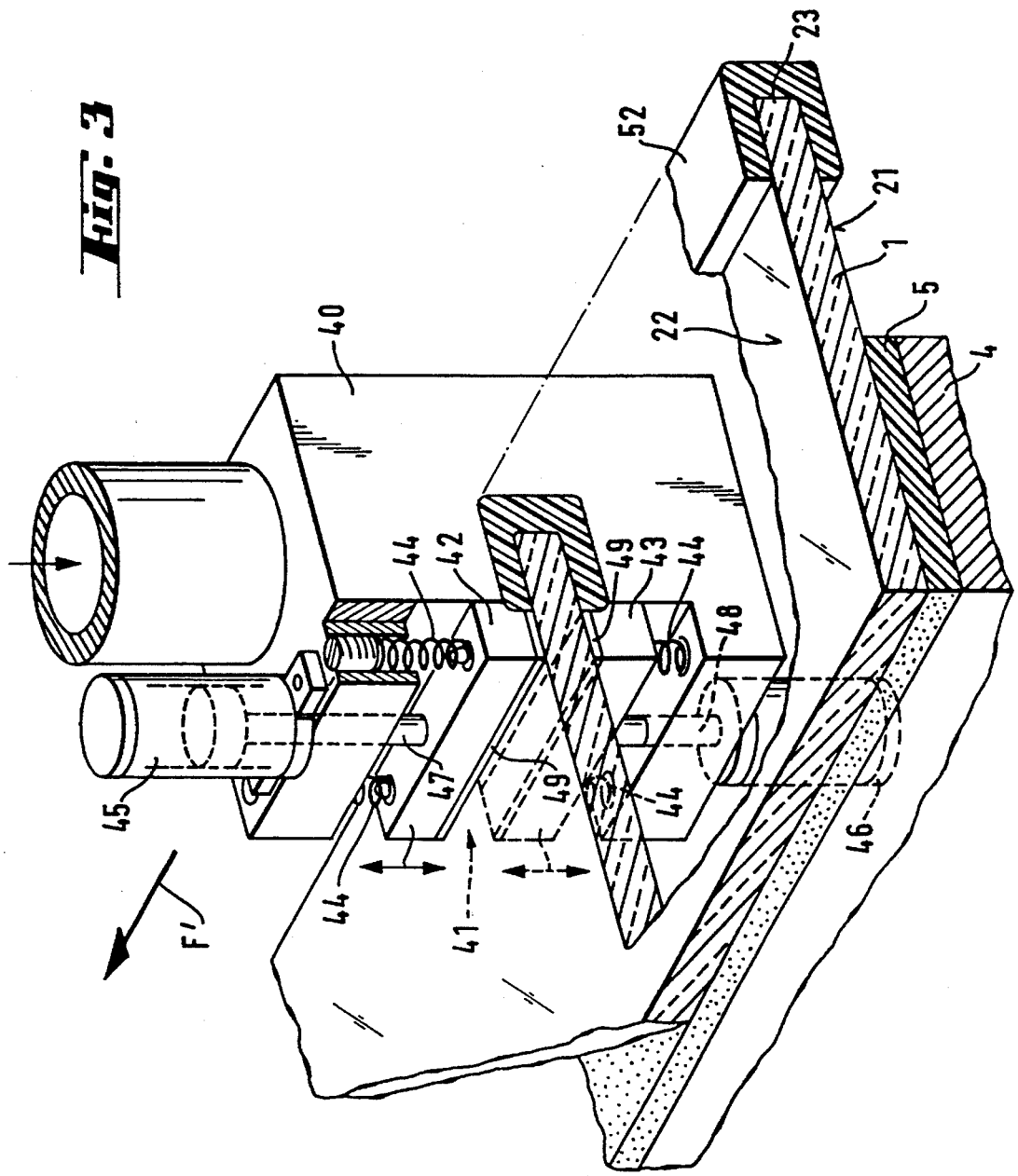
FIG. 3 illustrates an embodiment of an extrusion head for extruding a U-shaped frame around the edge of a glass plate.

The die 40 shown in FIG. 3 has a similar construction to the die 25 described relative to FIG. 2, but differs from the latter in that it is provided on both sides of the mouth-like recess 41 with displaceable sealing ledges 42, 43. These sealing ledges 42, 43 are in turn biased by helical springs 44 against the two main faces of the glass plate 1. By means of the pneumatic or hydraulic cylinders 45, 46, the sealing ledges are moved by means of rods 47, 48 into their open end position, both when the die is brought from its waiting position into the working position on the edge of the glass plate and when it is removed from the glass plate at the end of the extrusion process. Interchangeable support layers 49, made from an elastic material having good sliding characteristics on glass, are also provided on the sliding faces of the two sealing ledges 42, 43. The die 40 is suitable for the extrusion of a frame 52, which borders on all three sides of the border region of the glass plate in a U-shaped manner.

Figure 4:
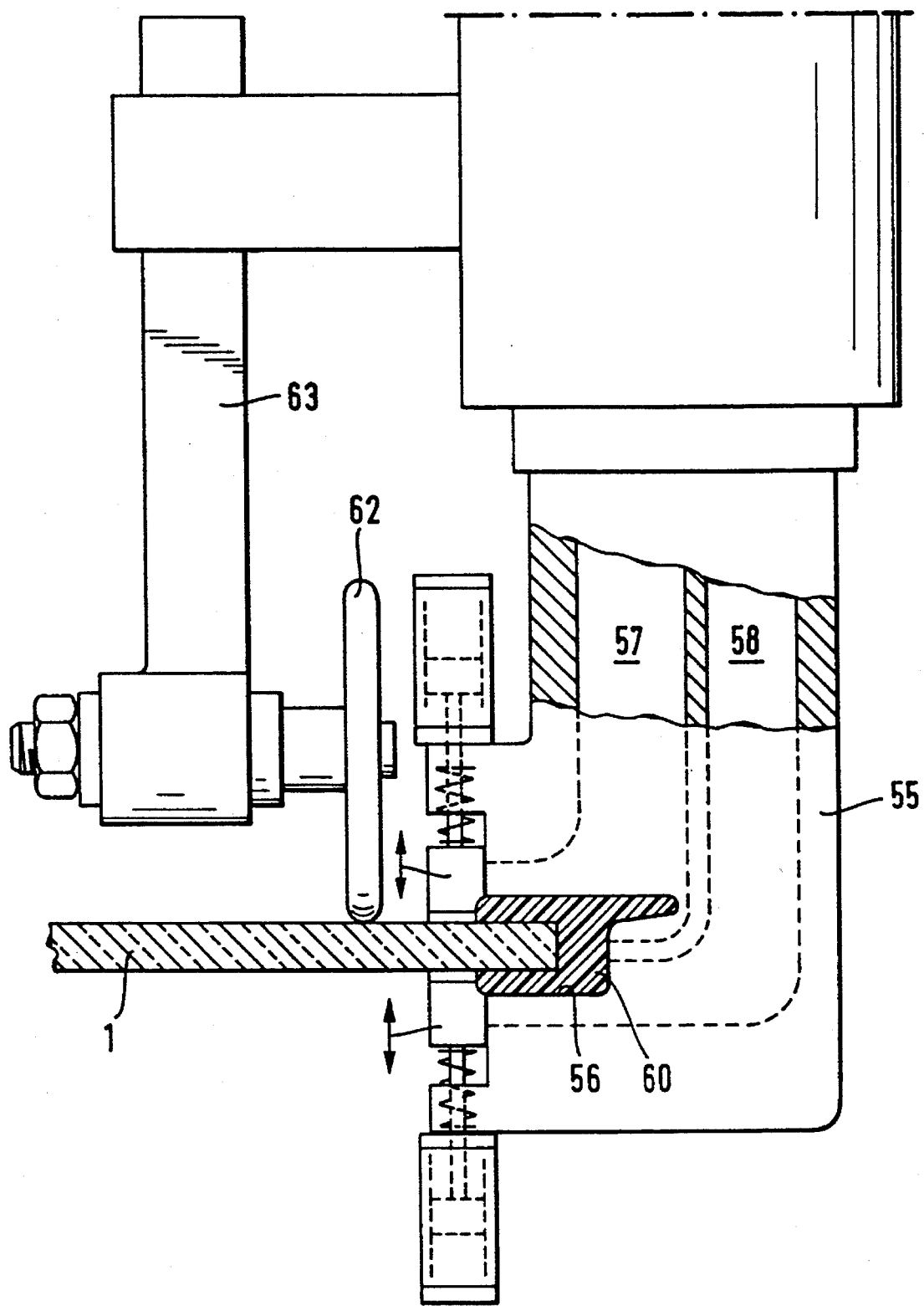
FIG. 4 shows a detail of an extrusion head suitable for performing the process.

FIG. 4 shows a die 55 constructed according to the described principle in its working position, in which the calibrated die aperture 56 is supplied by means of two separate channels 57, 58 with the polymer to be extruded. By suitable blocking devices within these channels or in the lines supplying the channels with the polymer, it is possible to separately regulate the polymer volume flow within the two channels. This makes it possible to supply different parts of the die cross-section of the die aperture 56 with different volume flows if, as in the represented case, the cross-section of the frame profile 60 is not symmetrical and consequently in one part of the die aperture a larger material quantity is required than in the other part.

Additionally, in this case, a support wheel 62 and mounting bracket 63 are positioned on the extrusion head that carries the die 55. This support wheel 62 compensates for shape tolerances of the glass plate 1 in a direction perpendicular to the plate surface, and is particularly useful in the case of curved glass plates. For this purpose, the extrusion head is movably mounted by a few millimeters in the vertical direction, so that the necessary tolerance compensation takes place via the support wheel 62.

What is claimed is:

1. An apparatus for producing a shaped polymer frame on a plate having top and bottom main surfaces and a peripheral edge, which comprises:
   an extrusion die having a body which defines a plate-receiving recess for receiving the edge of the plate and portions of the main surfaces adjacent thereto; and
   a first sealing ledge which is movable between (1) a retracted position which allows entry of the plate edge into the recess, and (2) an engaged position in contact with one of the main surfaces of the plate, wherein an open area is defined between the die body, sealing ledge and the plate in the shape of the polymer frame.

2. The apparatus of claim 1 which further comprises means for moving the first sealing ledge between the retracted and engaged positions in a direction which is essentially perpendicular to the main surfaces of the plate.

3. The apparatus of claim 2 wherein the moving means comprises spring means for biasing the first sealing ledge toward the engaged position and rod means for returning the first sealing ledge to the retracted position.

4. The apparatus of claim 1 wherein the recess includes a first surface which is spaced from the plate and a second surface which contacts the plate on the surface opposite that which is contacted by the first sealing ledge in the engaged position, so that the polymer frame is provided on the edge and a portion of one main surface of the plate.

5. The apparatus of claim 4 wherein the portions of the first sealing ledge and recess which contact the plate include a layer of an elastic material thereon to facilitate sliding movement upon the plate.

6. The apparatus of claim 1 which further comprises a second sealing ledge which is movable between (1) a retracted position which allows entry of the plate edge into the recess, and (2) an engaged position in contact with the other main surface of the plate.

7. The apparatus of claim 6 wherein one or both of the sealing ledges includes an arcuate surface which assists in the formation of an arcuate portion for the polymer frame.

8. The apparatus of claim 6 wherein the recess includes first and second surfaces Which are spaced from the plate, so that the polymer frame is provided on the edge and a portion of each main surface of the plate.

9. The apparatus of claim 1 which further comprises a support wheel which travels along the surface of the plate and compensates for shape tolerances of the plate.

10. The apparatus of claim 1 wherein the extrusion die includes two channels for supplying polymer to the open area and means for independently regulating the flow of polymer in each channel.

11. The apparatus of claim 1 which further comprises means for extruding the polymer through the open area and onto the plate.

12. A process for producing a shaped polymer frame on a plate having top and bottom main surfaces and a peripheral edge, which process comprises:
   placing adjacent the plate an extrusion die having a body which defines a plate-receiving recess for receiving the edge of the plate and portions of the main surfaces adjacent thereto; and a first sealing ledge which is movable between (1) a retracted position which allows entry of the plate edge into the recess, and (2) an engaged position in contact with one of the main surfaces of the plate, wherein an open area is defined between the die body, sealing ledge and the plate in the shape of the polymer frame;
   receiving the plate edge in the recess of the extrusion die;

moving the first sealing ledge into contact relation with at least one of the main surfaces of the plate; and depositing polymer onto the plate edge and a portion of at least one of the adjacent main surfaces through the open area of the die during relative movement of the die and plate to provide the polymer frame.

13. The method of claim 12 wherein the polymer is a moisture-hardening reaction polymer which is deposited upon the plate while the die travels along the peripheral edge of the plate.

14. The method of claim 12 wherein the first sealing edge moves in a direction which is essentially perpendicular to the main surfaces of the plate and is biased towards the engaged position and the method further comprises returning the first sealing ledge to the retracted position after deposition of the polymer frame.

15. The method of claim 12 wherein the extrusion die further comprises a second sealing ledge which is movable between (1) a retracted position which allows entry of the plate edge into the recess, and (2) an engaged position in contact with the other main surface of the plate, and the method further comprises moving the second sealing ledge into contact relation with the other main surface of the plate.

16. The method of claim 15 wherein each sealing ledge is biased towards the engaged position and the method further comprises returning each sealing ledge to the retracted position after deposition of the polymer frame.

17. The method of claim 12 wherein the extrusion die includes two channels for supplying polymer to the open area and the method further comprises independently regulating the flow of polymer in each channel to facilitate the filling of the open area of the extrusion die.

18. The method of claim 12 wherein the recess includes a first surface which is spaced from the plate and a second surface which contacts the plate on the surface opposite that which is contacted by the first sealing ledge in the engaged position, and the method further comprises providing the first sealing ledge and the second surface of the recess a layer of an elastic material thereon to facilitate sliding movement upon the plate.

19. The method of claim 15 wherein the recess includes first and second surfaces which are spaced from the plate so that the polymer frame is provided on the edge and a portion of each main surface of the plate, and the method further comprises providing each sealing ledge with a layer of an elastic material thereon to facilitate sliding movement upon the plate.

20. The method of claim 15 which further comprises forming an arcuate portion on the polymer frame by providing one or both of the sealing ledges with an arcuate surface which assists in the formation of the polymer frame.

21. The method of claim 12 which further comprises compensating for shape tolerances of the plate as the die travels along the plate.

22. The method of claim 13 wherein the moisture hardening reaction polymer comprises a thermoplastic polyolefin elastomer constituted by isotactic polypropylene and ethylene propylene diene rubber.

* * * * *